(12) United States Patent
Kivley

(10) Patent No.: US 7,694,424 B2
(45) Date of Patent: Apr. 13, 2010

(54) METHODS, APPARATUSES, AND SYSTEMS FOR ADVERTISING ON A FIRST-DOWN MEASUREMENT DEVICE

(76) Inventor: Thomas Kivley, 3221 Alder Ave., Merced, CA (US) 95340

(*) Notice: Subject to any disclaimer, the term of this patent is extended or adjusted under 35 U.S.C. 154(b) by 0 days.

(21) Appl. No.: 11/974,304

(22) Filed: Oct. 11, 2007

(65) Prior Publication Data

US 2008/0184571 A1 Aug. 7, 2008

Related U.S. Application Data

(60) Provisional application No. 60/899,199, filed on Feb. 1, 2007.

(51) Int. Cl.
*G01C 15/02* (2006.01)
*A63B 71/06* (2006.01)

(52) U.S. Cl. .................................. 33/289; 473/490

(58) Field of Classification Search ............. 33/289; 59/92, 93; 116/200, 222; 473/476, 477, 473/490

See application file for complete search history.

(56) References Cited

U.S. PATENT DOCUMENTS

| | | | |
|---|---|---|---|
| 3,678,592 A | 7/1972 | Williamson | |
| 3,768,435 A | 10/1973 | Dicker | |
| 4,026,554 A | 5/1977 | Karkoska | |
| 4,806,924 A | 2/1989 | Giraud et al. | |
| 4,954,939 A * | 9/1990 | Hutchins | .................. 59/93 |
| 5,280,904 A | 1/1994 | Rodriguez | |
| 5,892,554 A | 4/1999 | DiCicco et al. | |
| 5,917,553 A | 6/1999 | Honey et al. | |
| 5,979,113 A | 11/1999 | Hering | |
| 6,012,228 A | 1/2000 | Fisanich | |
| 6,141,060 A | 10/2000 | Honey et al. | |
| 6,196,938 B1 * | 3/2001 | Wiedner | .................. 473/476 |
| 6,297,853 B1 | 10/2001 | Sharir et al. | |
| 6,983,767 B2 | 1/2006 | Rickards | |
| 7,116,342 B2 | 10/2006 | Dengler et al. | |
| 7,154,540 B2 | 12/2006 | Honey et al. | |
| 2001/0026319 A1 | 10/2001 | Honey et al. | |
| 2002/0092132 A1 | 7/2002 | Kessler | |
| 2004/0116214 A1 | 6/2004 | Forrest, Sr. | |
| 2004/0238394 A1 * | 12/2004 | Fuemmeler | .............. 206/459.5 |
| 2005/0001852 A1 | 1/2005 | Dengler et al. | |
| 2006/0189419 A1 | 8/2006 | Cataldo | |
| 2007/0085908 A1 | 4/2007 | Honey et al. | |
| 2007/0197307 A1 * | 8/2007 | Mangiaracina et al. | ...... 473/175 |
| 2007/0210095 A1 * | 9/2007 | Bigger | .................. 220/741 |
| 2008/0043157 A1 | 2/2008 | Jones | |
| 2008/0127881 A1 * | 6/2008 | Stegmann et al. | .......... 116/173 |
| 2008/0189215 A1 | 8/2008 | Travez et al. | |

* cited by examiner

*Primary Examiner*—G. Bradley Bennett
(74) *Attorney, Agent, or Firm*—Marcus N. DiBuduo; Mark D. Miller

(57) ABSTRACT

Methods, apparatuses, and systems for advertising on a first-down measurement device in an American-style football game are disclosed. An apparatus may include an information display and a sleeve for engaging the information display with a portion of the first-down measurement device. A method may include fixing an advertisement to a material and engaging the material with a portion of a first-down measuring device. A system may include a sideline marker for marking a position of a playing field, a measuring device connected to the sideline marker, an information display, and a sleeve for engaging the information display with the sideline marker or the measuring device. First-down measurement devices containing the information display of the present invention may also be used in simulated American-style football games in which first-down measurements are displayed, such as video game(s).

33 Claims, 15 Drawing Sheets

METHODS, APPARATUSES, AND SYSTEMS FOR ADVERTISING ON A FIRST-DOWN MEASUREMENT DEVICE

CROSS-REFERENCE TO RELATED PATENT APPLICATIONS

The present application claims the benefit of U.S. Provisional Patent Application No. 60/899,199, filed Feb. 1, 2007, which is incorporated herein by reference in its entirety.

FIELD OF THE INVENTION

The present invention generally relates to the field of advertising and marketing devices. More specifically, embodiments of the present invention pertain to methods, apparatuses, and systems for advertising and marketing using one of several devices coupled to one or more portions of a 10-yard first-down chain and/or adjacent sideline markers used during an American-style football game.

DISCUSSION OF THE BACKGROUND

It is well known that in order to achieve a first-down during an American-style football game, it is necessary to advance the football ten yards from the position of the previous first-down. In order to identify the location of the previous first-down, and to identify a target location ten yards away that must be reached for another first-down, a first-down measurement device including a pair of sideline markers connected by a ground level chain ten yards in length is used. When a team receives possession of the football, or a first-down is achieved, one of the sideline markers is placed on the sideline parallel to the location of the football. The chain is then stretched to its 10-yard length such that the second sideline marker denotes the sideline location where the football must be advanced for the team in possession of the ball to achieve another first-down. The sideline markers are usually in the form of posts or poles, connected by the ten yard chain, which may be inserted into the grassy or artificial sideline turf, each post usually having a brightly colored target at the top that can be seen by players and fans. During the course of a football game, each time a team takes possession of the ball, and each time a first-down is achieved, the sideline markers are moved to show the current location of the ball and to show the 10-yard distance that must be achieved for a first-down.

Often, the football is advanced very close to ten yards, but since the sideline markers are on the sidelines of the playing field and usually a significant distance from the football, it may be difficult to determine whether the 10-yard distance has actually been reached. There is typically a tag provided on the chain that may be slid along the chain to the closest 5-yard line nearest to the first-down sideline marker. In these situations, the tag is moved down the chain so that it is at the closest 5-yard line nearest to the first-down sideline marker (or an official may grasp the chain at the nearest 5-yard line), and then the sideline markers and chain are taken from the sidelines onto the playing field to where the football is located for a measurement. The tag (or location where the official grasped the chain) is placed on the closest 5-yard line on the playing field to assure proper placement of the chain, and the chain stretched to where the football rests. At a climactic moment, the sideline marker at the end of the chain is brought next to the football to see if it has been advanced the necessary ten yards. During these situations, which may occur frequently during a football game, all eyes are on the sideline marker and the football (or on an in-house football stadium scoreboard) to see whether a first-down has been achieved. During televised football games, cameras are zoomed in on the football and the bottom of the sideline marker attached to the chain to see if the first-down has been achieved, and if not, to see what distance is needed to achieve it.

It is well known that advertising indicia are placed on football helmets, jerseys and other equipment so that viewers of the game are exposed to these indicia during the course of the game. The frequent focus on the bottom of a sideline marker provides an excellent opportunity for similar advertising and marketing or for providing any appropriate message.

It is therefore desirable to provide methods, apparatuses, and systems for displaying advertising indicia on first-down measurement devices including chains and/or sideline markers during American-style football games.

SUMMARY OF THE INVENTION

Embodiments of the present invention relate to methods, apparatuses, and systems for displaying and/or providing information and/or messages including without limitation advertising, marketing and/or promotional information on first-down measurement devices used during American-style football games, whether professional, college, high school or any other level.

In one aspect, the invention concerns an apparatus for use in an American-style football game that can include an information display and a sleeve for engaging the information display with a portion of a first-down measurement device.

In another aspect, the invention concerns an apparatus for displaying information in an American-style football game that can include: an information display; a material for engaging the information display with a first portion of a first-down measurement device; a device fixed to the material for attaching a first section of the material to a second section of the material; a stabilizing device configured between the material and the first portion of the first-down measurement device; and a device for attaching the material to a second portion of the first-down measurement device.

In yet another aspect, the invention concerns a method of advertising in an American-style football game that can include fixing an advertisement to a material and engaging the material with a portion of a first down-down measurement device.

In yet another aspect, the invention concerns a system for communicating information in an American-style football game that can include: a sideline marker for marking a position on a playing field; a measuring device connected to the sideline marker; an information display; and a sleeve for engaging the information display with the sideline marker or the measuring device.

In another aspect, the invention concerns an apparatus for displaying information in an American-style football game that can include a sleeve engaged to a first-down measurement device, the sleeve including an information display, wherein the sleeve may be wrapped around about one yard of a chain of the first-down measurement device.

In one aspect, the invention concerns a method of advertising in a simulated American-style football game that can include marking the relative position of a football on a playing field with a first-down measurement device, and displaying an advertisement on a portion of the first-down measurement device.

The present invention advantageously provides a novel approach to advertising during American-style football games by displaying advertisements on a first-down measurement device.

These and other objects, advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION

Figure 1:
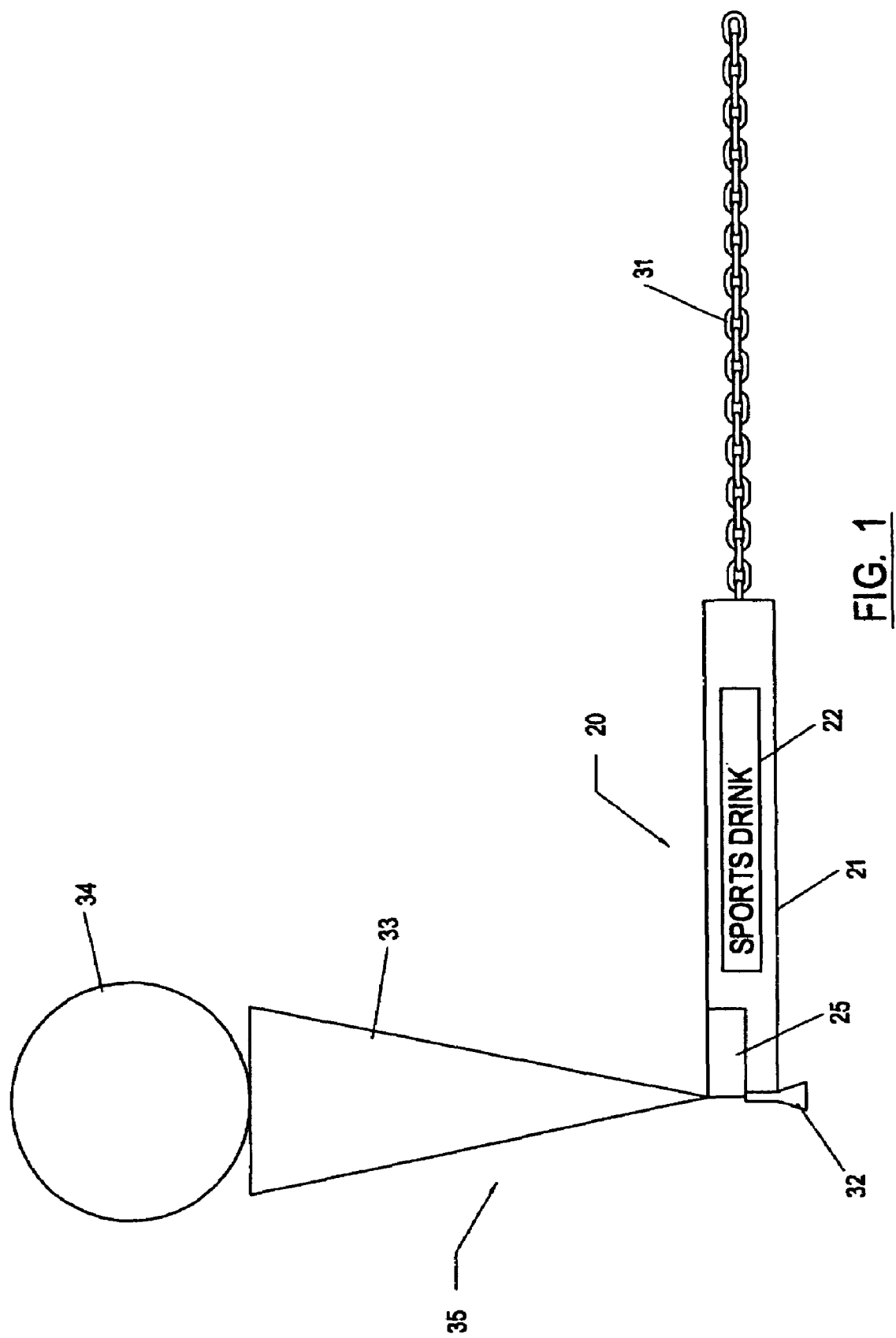
FIG. 1 is an environmental view diagram showing an exemplary implementation of an apparatus for use in an American-style football game in accordance with the present invention.

The invention, in its various aspects, will be explained in greater detail below with regard to preferred embodiments. While the invention will be described in conjunction with the preferred embodiments, the preferred embodiments themselves do not limit the scope of the invention. Rather the invention, as defined by the claims, may cover alternatives, modifications, and/or equivalents of the preferred embodiments. Similarly, the accompanying drawings do not limit the scope of the preferred embodiments and/or the invention, but rather, are illustrative of one or more examples of the preferred embodiments and/or invention.

An Exemplary Apparatus for Use in an American-Style Football Game

In one embodiment, an apparatus for use in an American-style football game can include an information display and a sleeve for engaging the information display with a portion of a first-down measurement device. In one example, and as shown in FIG. 1, an information display 22 may be engaged to a sleeve 20 which itself is engaged to a portion of a first-down measurement device.

In one implementation, the portion of the first-down measurement device to which the advertisement display may be coupled may include a chain. As shown in FIG. 1, the sleeve 20 may be placed around a portion of the chain 31. The chain 31 may be about ten yards in length and horizontally positioned between a first sideline marker 35 and a second sideline marker (not shown). The chain 31 may be deformable, and may be, but is not limited to, a traditional metal or plastic link chain, a rope, belt, a cable, and the like. The chain 31 however may not be deformable, and may be, but is not limited to, a fixed plastic or metal rod or pole and the like. The design and implementation of such chains are known to those in the art. In another implementation, the portion of the first-down measurement device to which the advertisement display may be coupled may include a sideline marker. For example, the advertisement display 22 may be coupled, via sleeve 20, to a post 32, a banner 33, and/or a target 34 of the vertically positioned sideline marker 35. The design and implementation of such sideline markers are also known to those in the art.

In one implementation, the sleeve may include a material having a first and a second section and a device fixed to the material for attaching the first section of the material to the second section of the material. In one implementation, the material may include a flexible material. The material may be, among other things, made of a waterproof fabric or other flexible material so as to resist damage or degradation from precipitation or other moisture that may be encountered during use. For example, the sleeve may be composed of a material such as plastic, vinyl, or GORE TEX® which can withstand rain, snow, and other weather conditions not uncommon during football seasons around the world. In implementations where the material is a flexible material, the device may be interweaving hooks and loops (e.g., VELCRO®), zipper(s), snaps, buttons, straps, or other suitable self-attaching device for attaching the first section of the flexible material to the second section.

Figure 2:
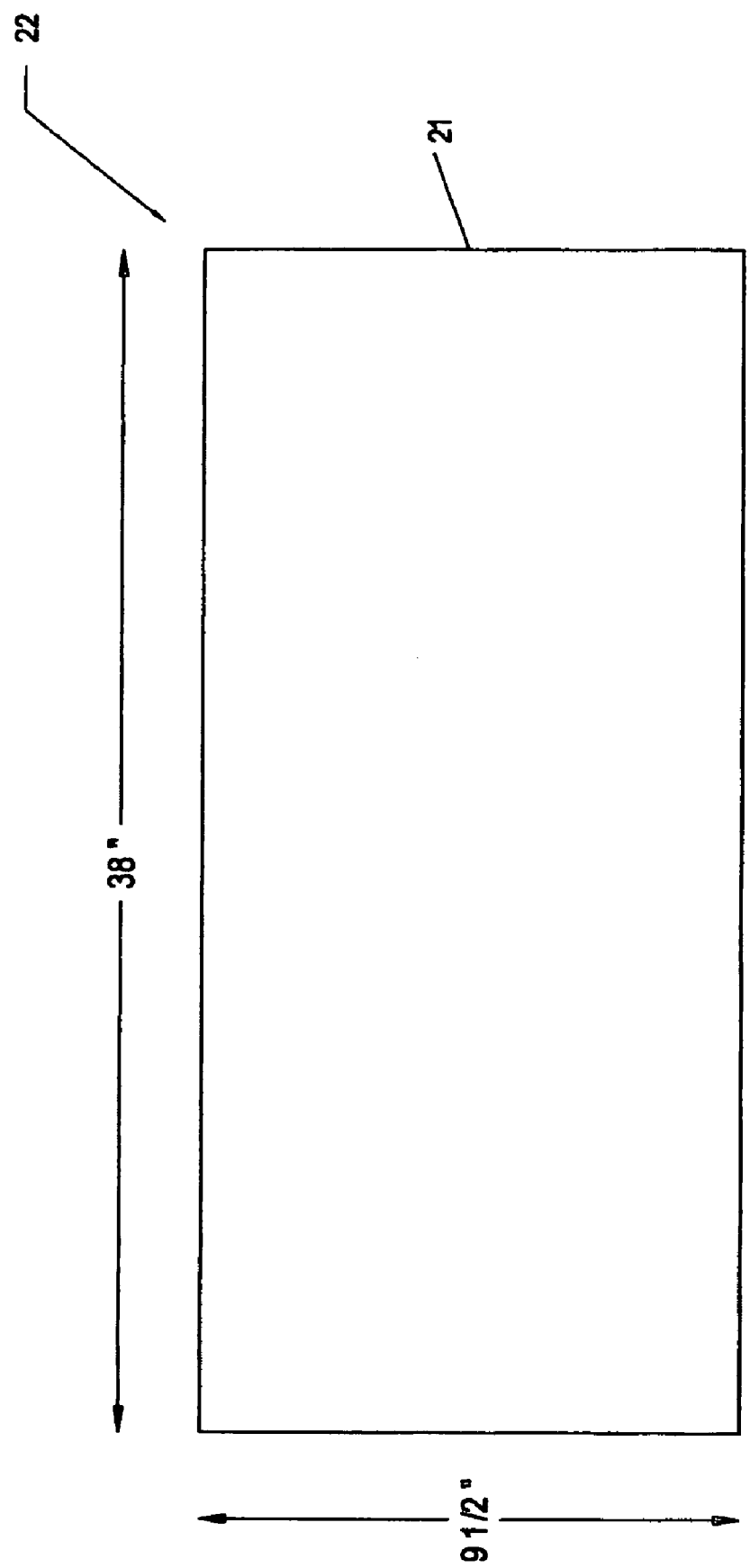
FIG. 2 is a plan view diagram showing an exemplary material in accordance with the present invention.
Figure 3:
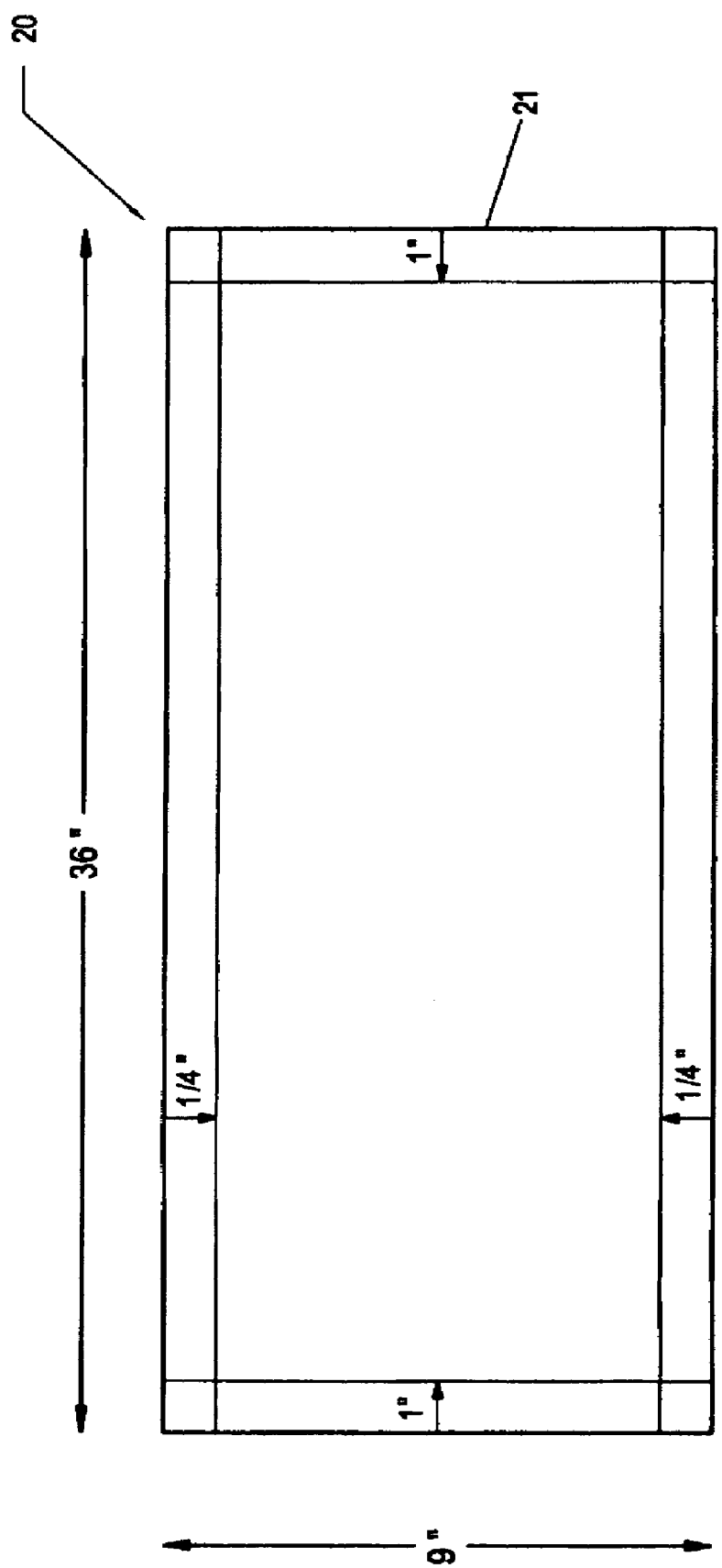
FIG. 3 is a plan view diagram showing another exemplary material in accordance with the present invention.

Continuing with an example as shown in FIG. 1, and referring now to FIG. 2, the sleeve 20 may be formed from a rectangular flexible material 21 which may be wrapped around the chain of the first-down measurement device and attached to itself using interweaving hooks and loops (e.g., VELCRO®), zipper(s), snaps, buttons or other suitable self-attachment devices such that the sleeve 20 is capable of sliding along the chain. The material 21 may be of any suitable dimension, and in the example embodiment, has a length of about 38" and a width of about 9.5". However, the material 21 may have any length and/or width, depending on the desired size and placement of the sleeve. For example, where the advertisement display is to be coupled to the chain of the first-down measurement device, it is preferred that the length of the sleeve should be less than 72" and preferably around 36" (i.e. about 1 yard). If the sleeve is about 36" in length, this leaves sufficient room on a ten yard chain for the moveable 5-yard tag to be positioned adjacent to a 5-yard line on the playing field during a measurement. The height of the sleeve should be such that it does not completely obstruct the view of the football in relation to the measurement device from the sideline. In most cases, a height of no more than half of the height of a regulation football, and preferably about 3" to 3½" inches, may be used. Further, and as shown in FIG. 3, the material 21 may be stitched along its edges for durability. In one embodiment, the material 21 may have a stitch of about ¼" to 1".

Figure 4:
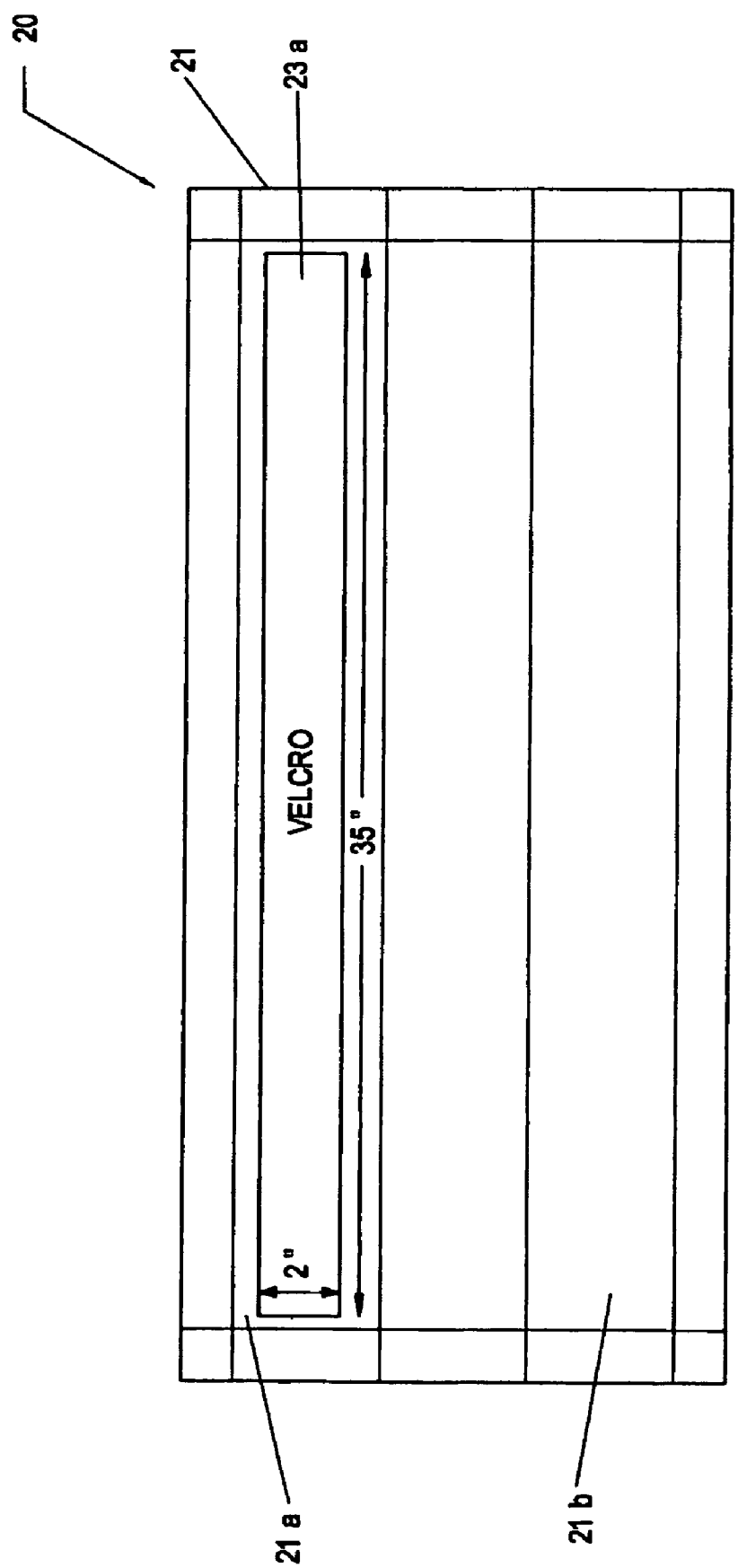
FIG. 4 is a plan view diagram showing the material of FIG. 3 to which a first device has been attached in accordance with the present invention.
Figure 5:
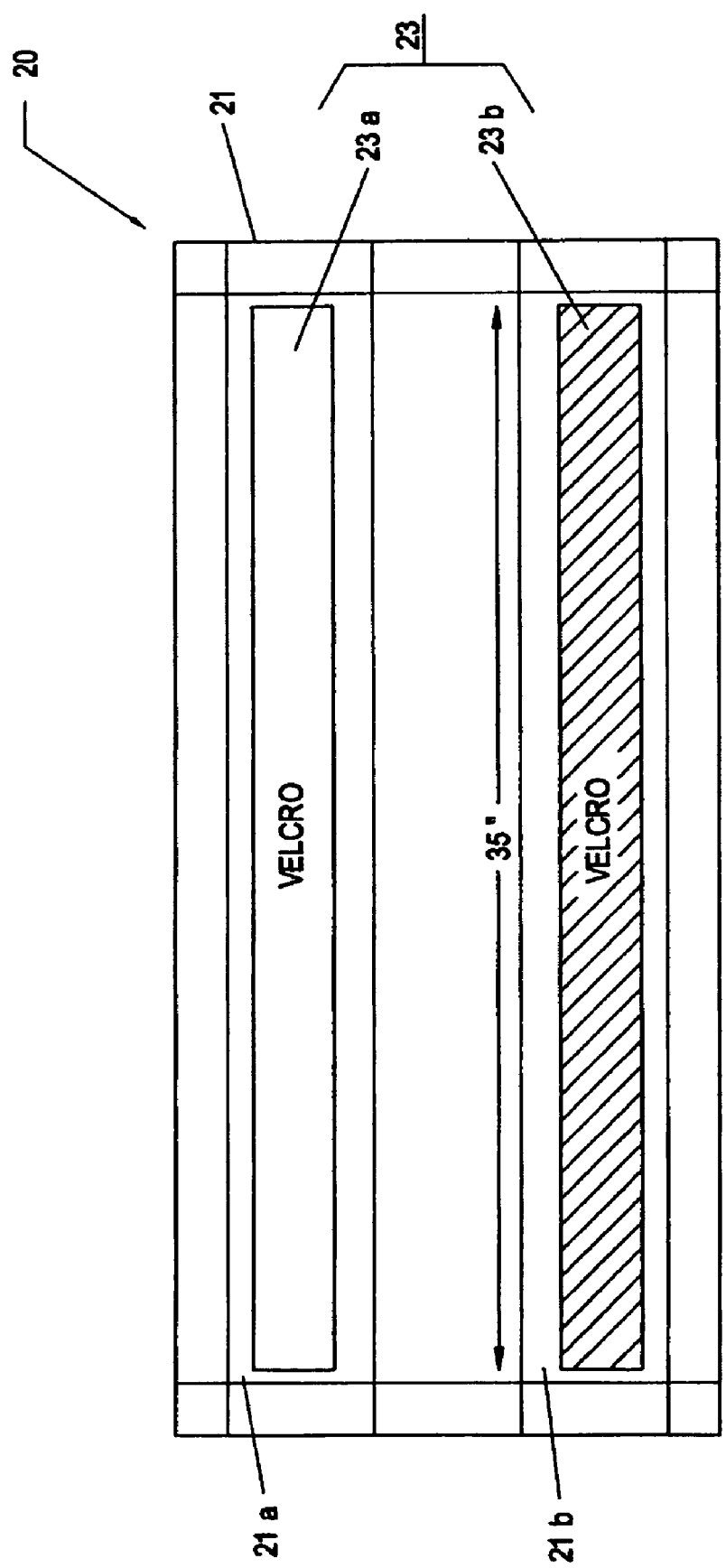
FIG. 5A is a plan view diagram showing an exemplary sleeve in accordance with the present invention.
FIG. 5B is an environmental view diagram showing the exemplary sleeve of FIG. 5A.
Figure 5B:
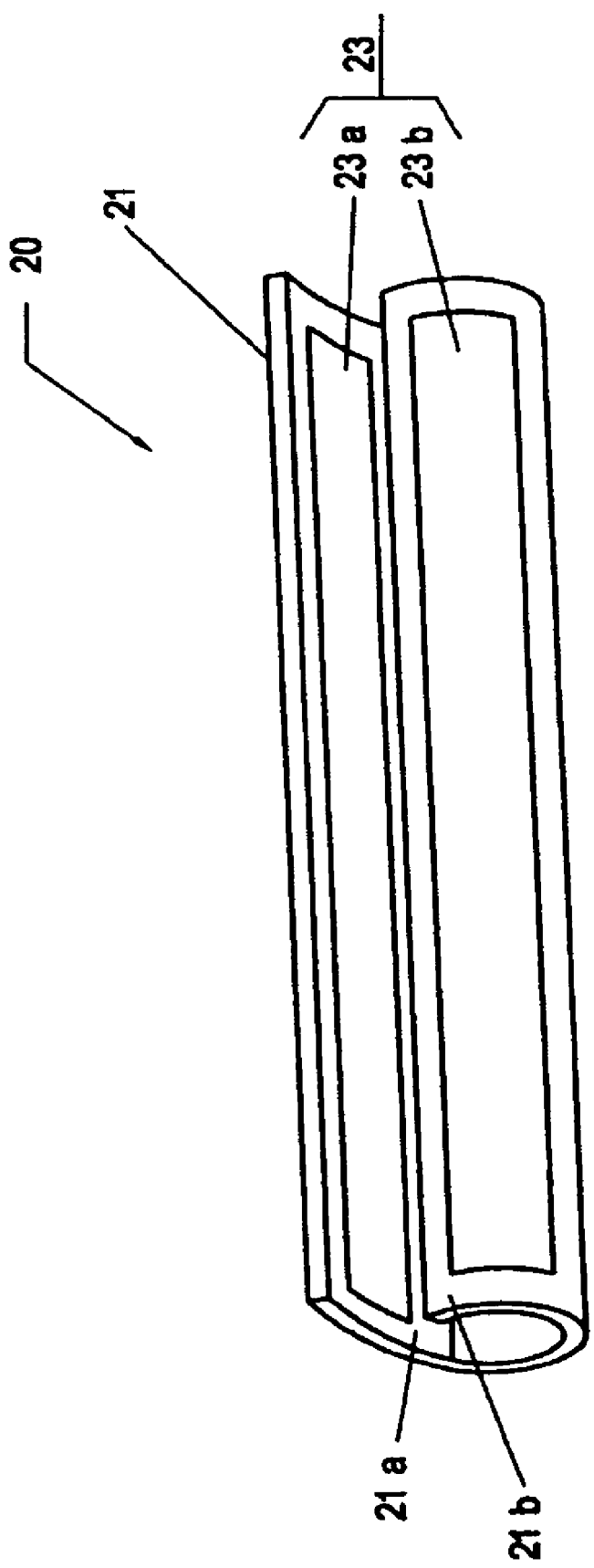

In some embodiments, the device for attaching the first and the second sections of the material may be interweaving hooks and loops (e.g., VELCRO®)). Referring now to FIG. 4, the material 21 may have a first section 21a and a second section 21b. As shown, the second section 21b may be at a location on a side opposite to that of the first section 21a (i.e., the first section is on the front of a material and the second section is on the back of the material). However, the second section may be at any location suitable for attaching the material to itself. The hooks 23a of a VELCRO® attachment device may be fixed on the first section 21a of material 21, and as shown in FIGS. 5A and 5B, the loops or pile 23b of a VELCRO® attachment device may be fixed to the second section 21b of the material 21. As such constructed, and as shown in FIG. 5B, the hooks 23a and loops 23b are situated such that the sleeve 20 may be wrapped around the chain of the first-down measurement device and then attached to itself.

Figure 6:
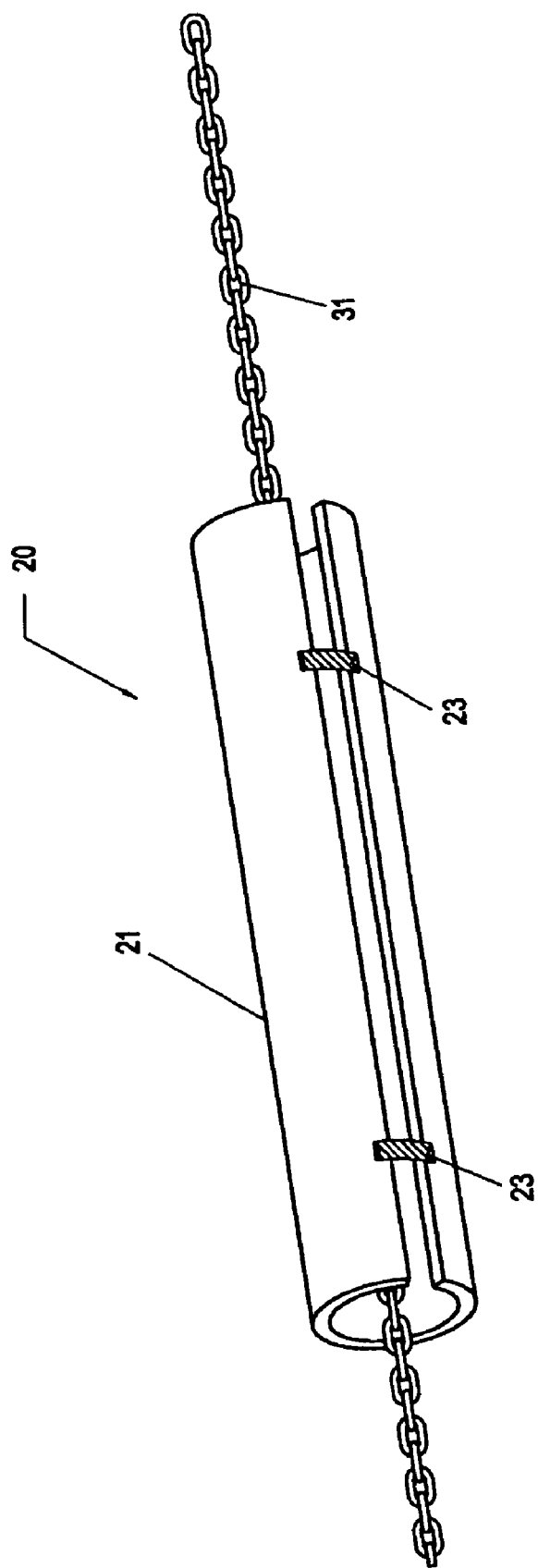
FIG. 6 is an environmental view diagram showing another exemplary sleeve in accordance with the present invention.

In another implementation, the material may include a rigid material having a hollow interior section. As shown in FIG. 6, the sleeve 20 may be a rigid material 21 such as a pipe having openings on both ends and an elongated cutout section extending the length of the material. As such, the material may have a "C"-shaped cross section. In some embodiments, the material may be, among other things, made of polyvinyl chloride (i.e., PVC), acrylonitrile butadiene styrene (i.e., ABS), plastic, fiberglass, metal, or any other durable material suitable for surrounding a portion of first-down measurement device. As shown, adhesive device 23 may be a latch for coupling a first section of the material 21 to a second section. However, in implementations where the material is a rigid material, the device may also be stitching, strap(s) including band(s) and/or belt(s), chain link(s), lock(s), clamp(s), eye(s) and hook(s), or some combination thereof for attaching a first section of the rigid material to a second section.

Figure 7:
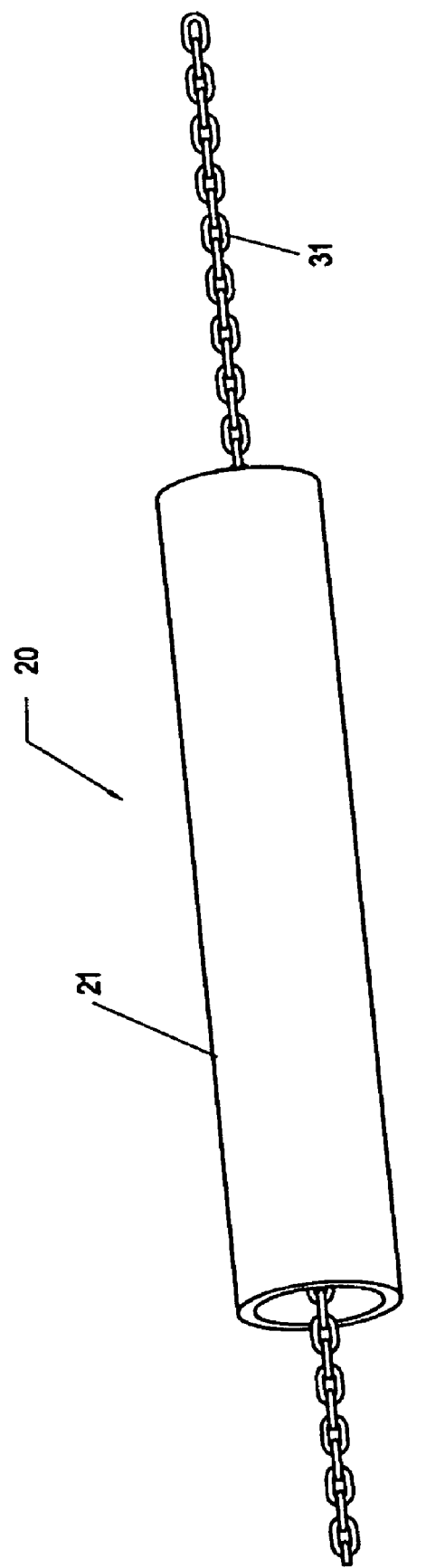
FIG. 7 is an environmental view diagram showing yet another exemplary sleeve in accordance with the present invention.

In another implementation, the sleeve may include a rigid material having (i) an hollow interior section and (ii) a first and a second opening for exposing the interior section. As shown in FIG. 7, the sleeve 20 may be a tubular rigid material 21 such as a PVC pipe or any other suitable rigid material such as ABS, plastic, fiberglass, or metal. The sleeve 20 may have openings on both ends such that the sleeve 20 may be slid on chain 31 before the chain 31 is attached to a sideline marker.

Figure 8:
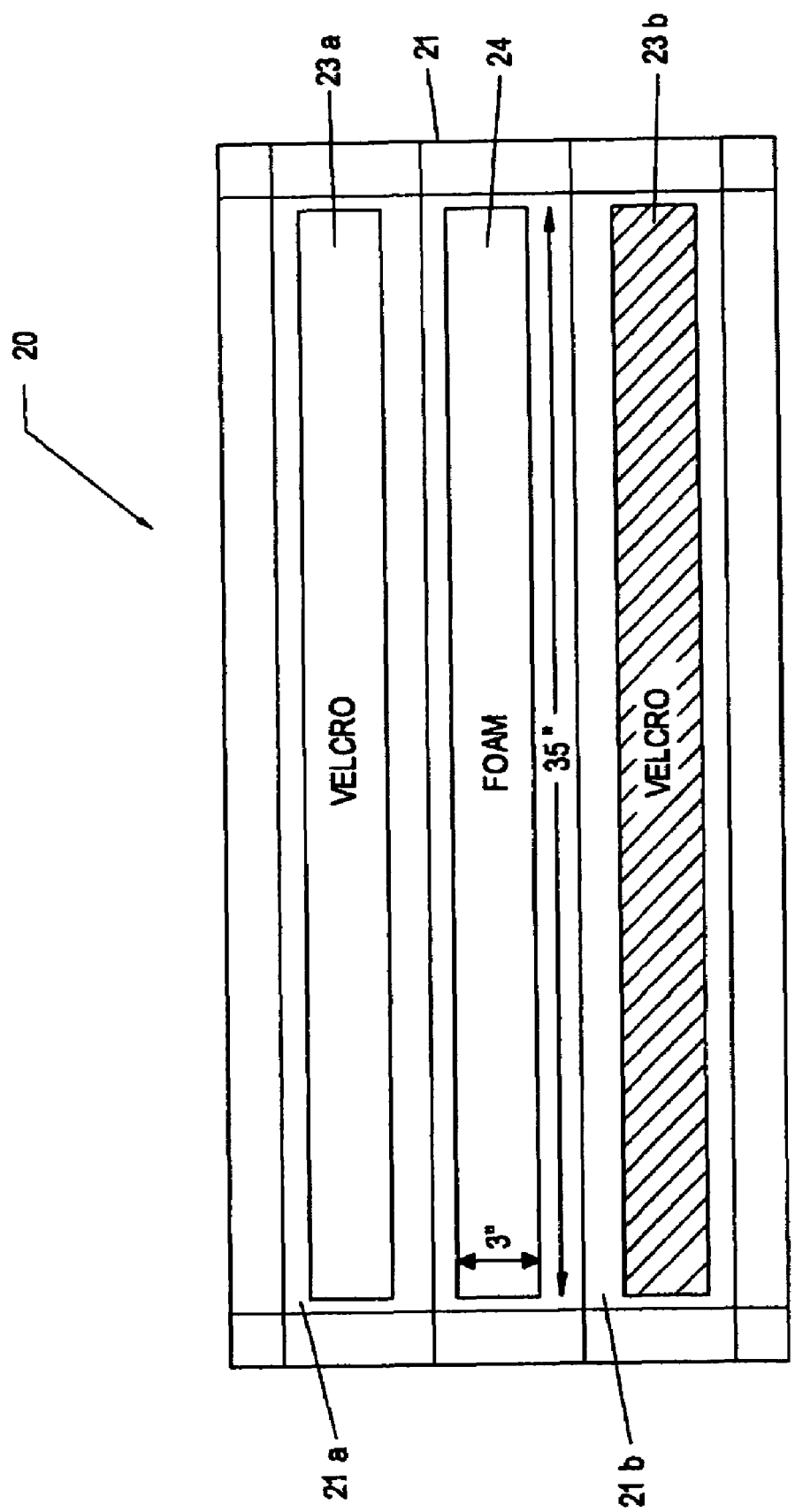
FIG. 8 is a plan view diagram showing an exemplary stabilization device in accordance with the present invention.

In one implementation, a stabilizing device may be located between the sleeve and a portion of the first-down measurement device for stabilizing the sleeve with respect to the portion of the first-down measurement device. Referring now to FIG. 8, and continuing with the example of FIGS. 5A and 5B, a stabilization device 24 such as foam, container(s) filled with gel, container(s) filled with air, brace(s), rib(s), interim spring(s), or any other such suitable stabilizing device should be located to form a stable and predictable surface for the display of information. As such, the stabilizing device should prevent the material 21 of sleeve 20 from collapsing against itself. In some embodiments, the stabilizing device 24 prevents the sleeve 20 from moving while wrapped around the chain of the first-down measurement device.

Figure 9:
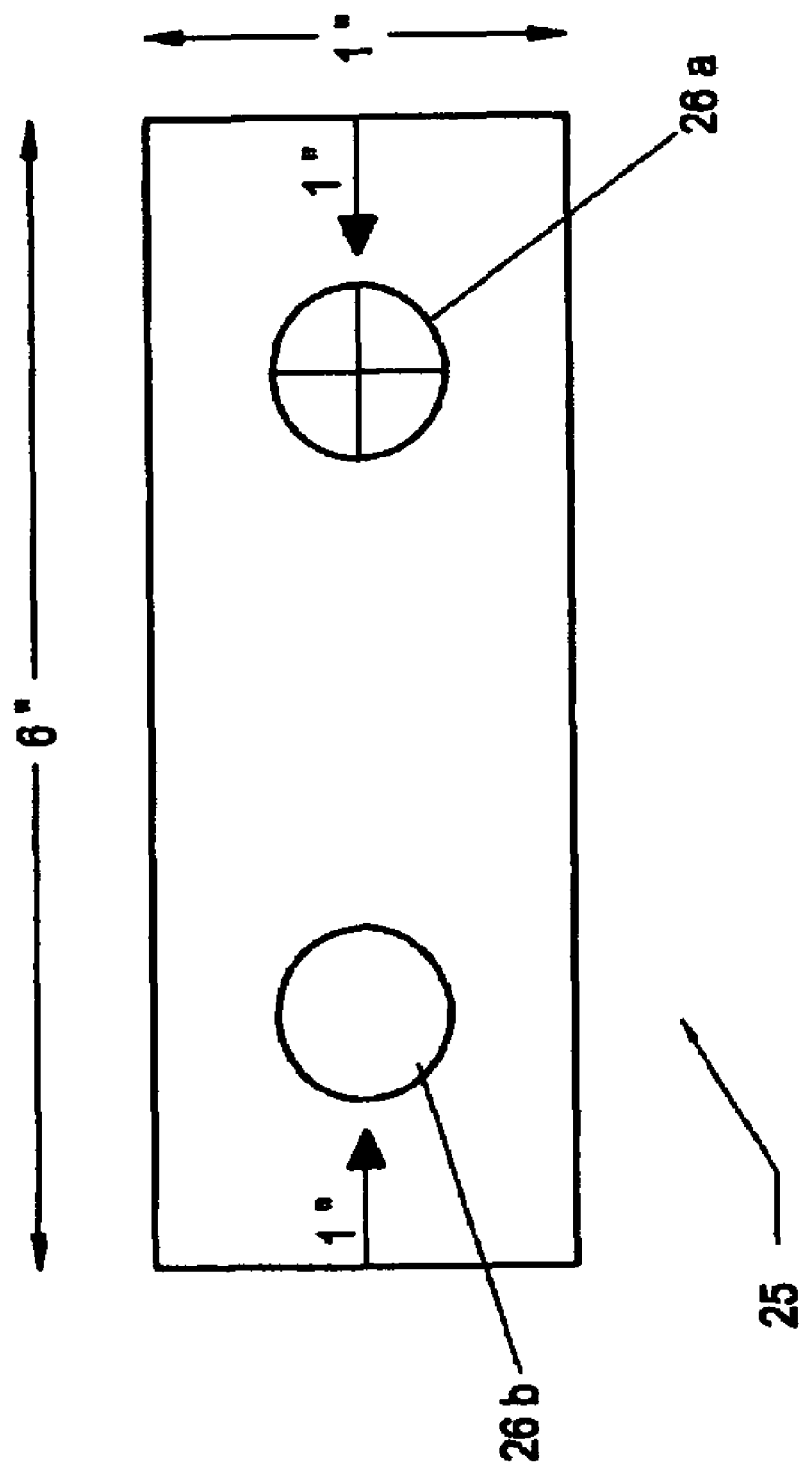
FIG. 9 is a plan view diagram showing an exemplary device in accordance with the present invention.
Figure 10:
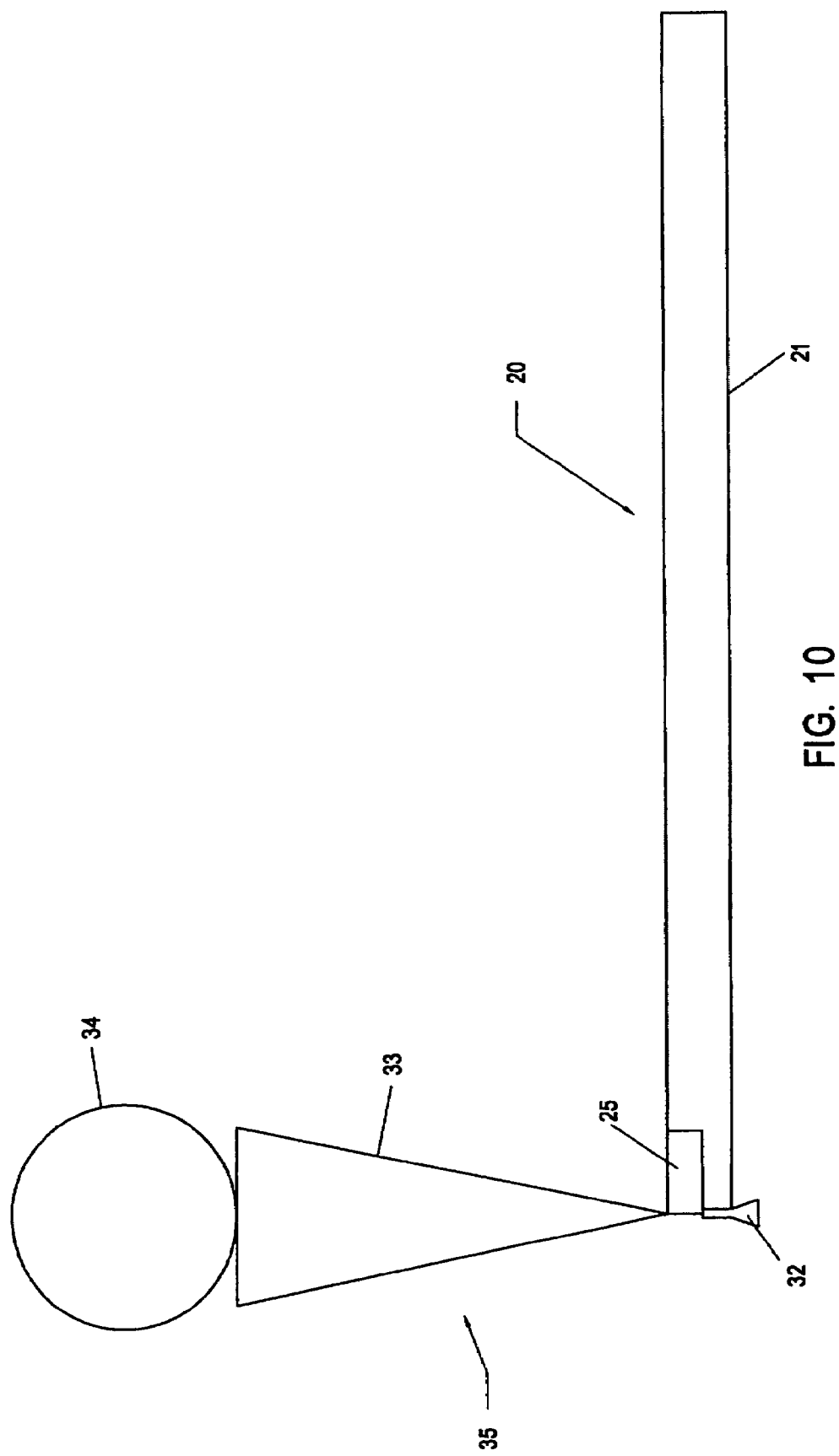
FIG. 10 is an environmental view diagram showing the device of FIG. 9 attached to both a sideline marker and a sleeve in accordance with the present invention.
Figure 11:
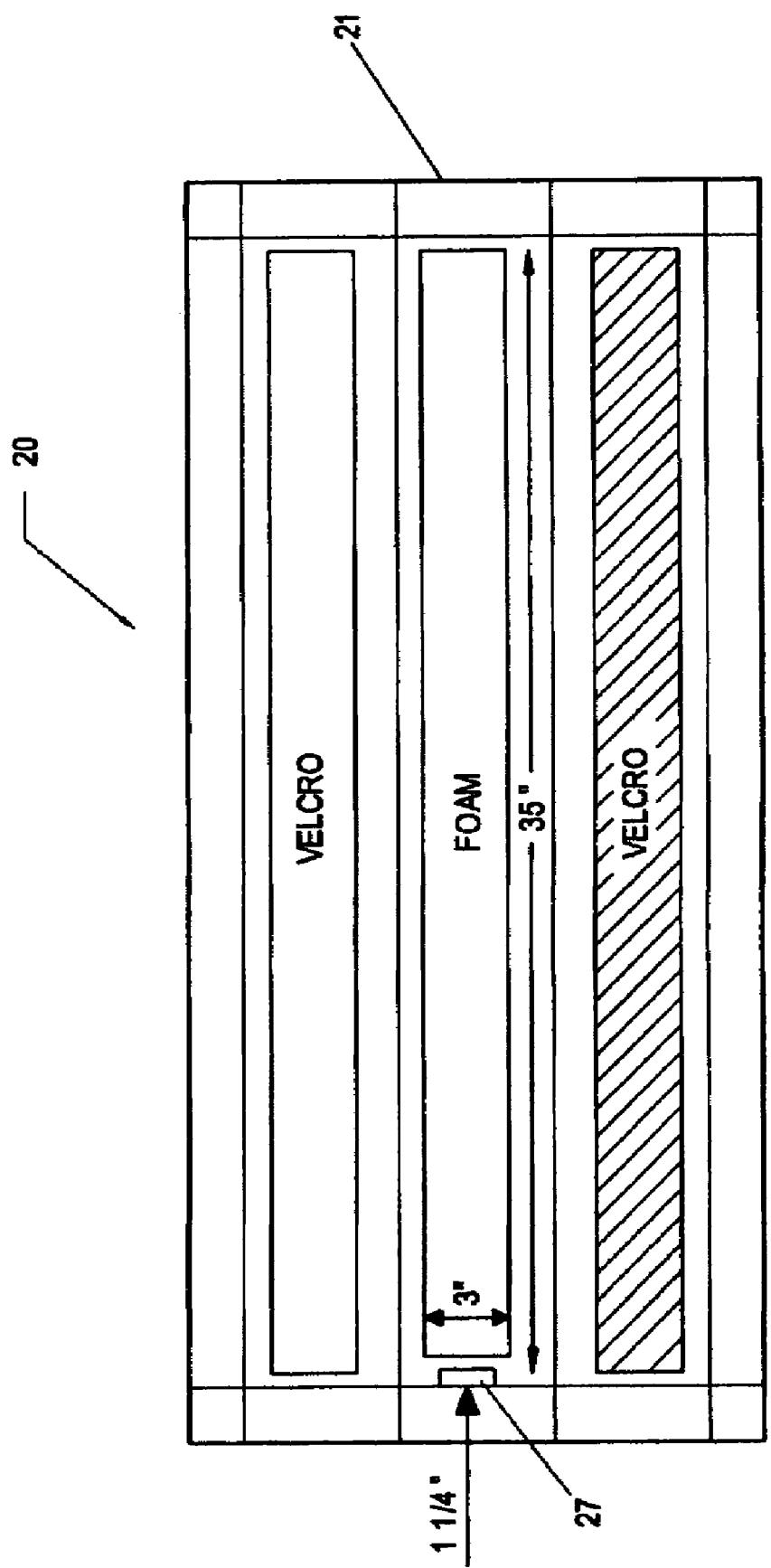
FIG. 11 is a plan view diagram showing the material of FIG. 5A adapted for receiving the device of FIG. 9.
Figure 12:
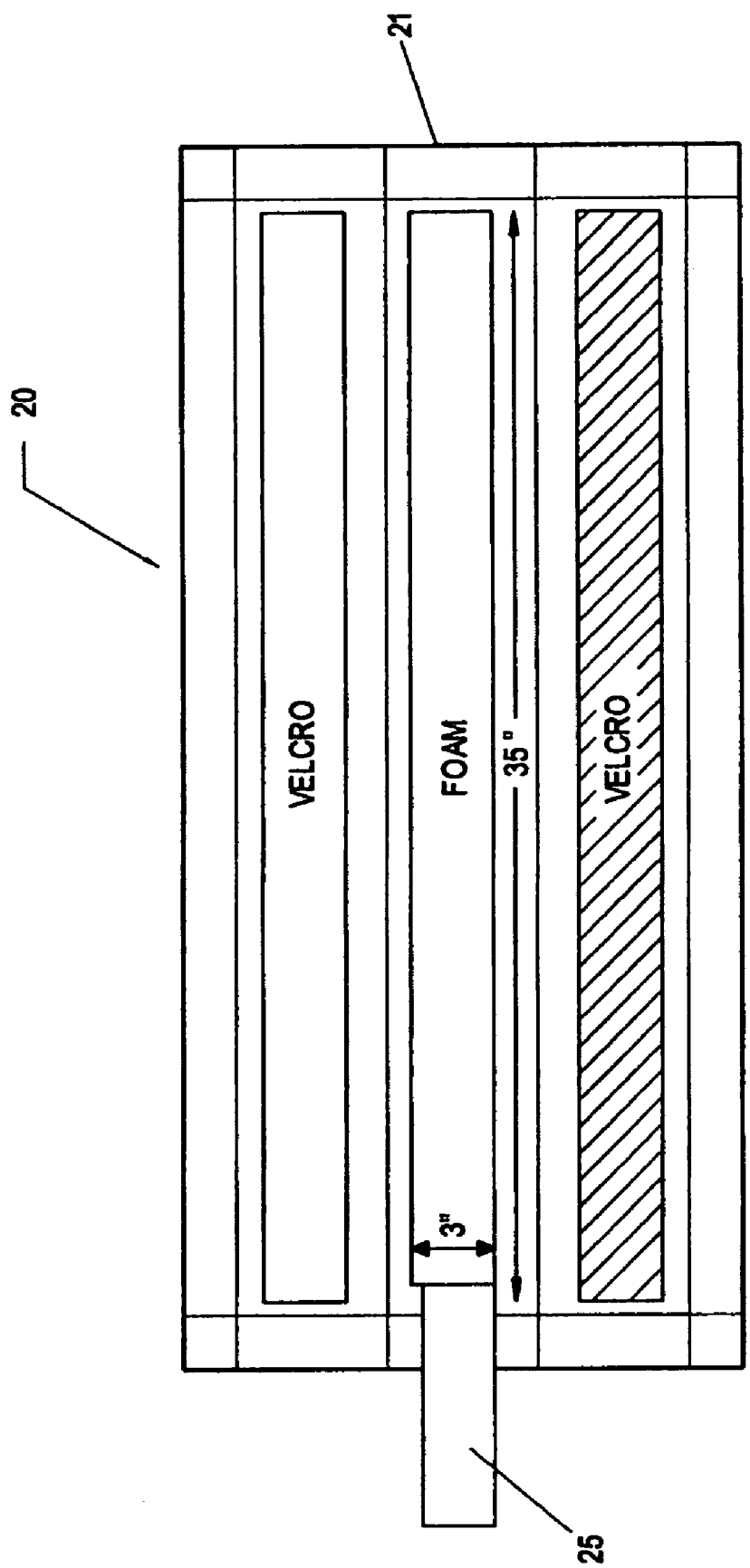
FIG. 12 is a plan view diagram showing the material of FIG. 5A to which the device of FIG. 9 has been attached.
Figure 13:
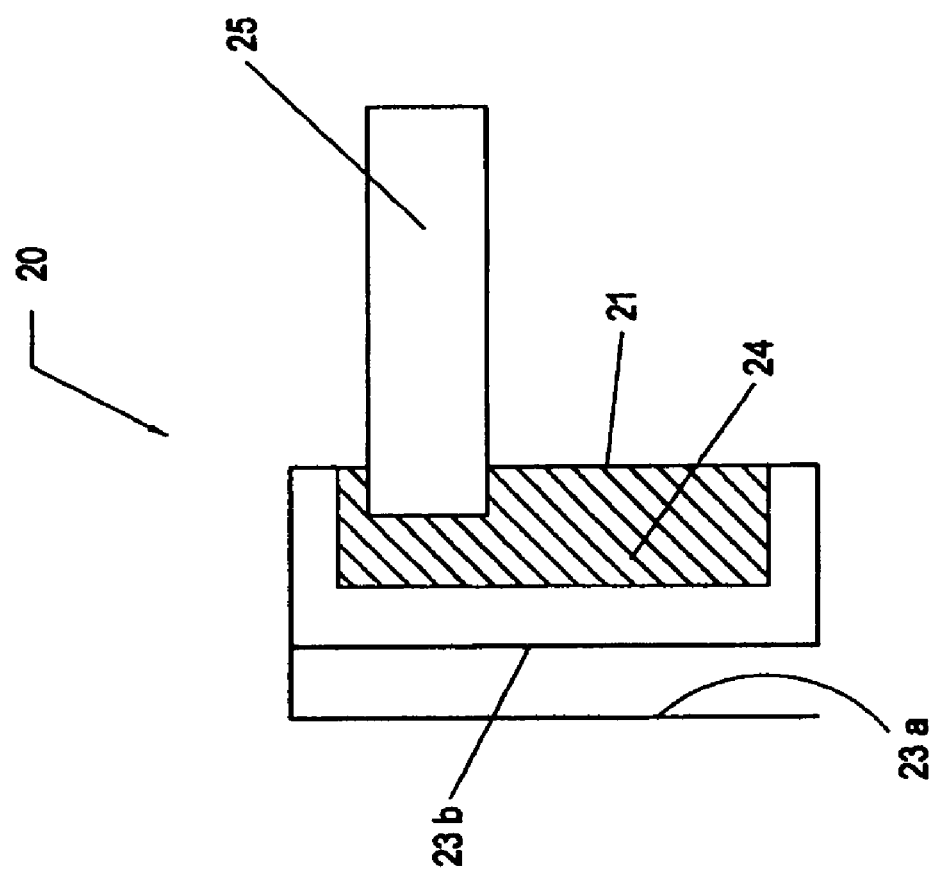
FIG. 13 is an enlarged side view diagram exemplifying an embodiment of the present invention.

In one implementation, the apparatus may further include a device for attaching the sleeve to a portion of the first-down measurement device. An example of such a device 25 is shown in FIG. 1 and shown in detail in FIG. 9. The device 25 may be a strap, a clip, a wire, a chain, fabric, or any similar device and may include device 26a and/or device 26b. Devices 26a and/or 26b may be interweaving hooks and loops (e.g., VELCRO®), snaps, buttons, or any other suitable self-attachment device. As shown in FIG. 10, the device 25 is designed to maintain the position of the sleeve 20 adjacent to the post 32 of the sideline marker 35 so that the sleeve 20 is seen when attention is drawn to a sideline marker 35 during an on-field measurement. As shown in FIG. 11, an area may be provided in material 21 for receiving an attachment device as described above. For example, material 21 may be provided with a hole 27 for receiving an attachment device 25. The device 25 may thereby be attached to the sleeve 20 as shown in FIG. 12. A side view exemplifying one aspect of the invention is shown in FIG. 13 wherein a first adhesive device 23a and a second adhesive device 23b are fixed to a material 21. Also shown are an attachment device 25 and a stabilization device 24.

It should also be noted that the term "information" as used herein may include, but is not limited to, advertising, messages, promotional material, logos, facts, data, and the like. In one implementation, the information display may include printed text and/or symbols. For example, the information display may be in the form of a sticker, paint, dye, or some other device for fixing text and/or symbols to the sleeve. The information display may be brightly colored so as to attract the attention of the viewing audience. The colors may or may not match those employed on the first-down measurement devices themselves, which are typically bright orange. In another implementation, the information display may include an area having a narrow chromatic bandwidth suitable for television color keying. As such, and for example, the color of the information display may be selected so as to accommodate television or editing process which would allow for different information to be superimposed on the information display at different times during a broadcast, as dictated by the purchaser. Typical colors used in television color keying are green or blue, but any other suitable color(s) may be used. In yet another implementation, the information display may include a means for attaching information to the sleeve, such as interweaving hooks and loops (e.g., VELCRO®). The information display may further be partitioned such that more than one advertisement, message, and the like may be placed thereon.

Another Exemplary Apparatus for Displaying Information in an American-Style Football Game In another embodiment, an apparatus for displaying information in an American-style football game can include: an information display; a material for engaging the information display with a first portion of a first-down measurement device; an device fixed to the material for coupling a first section of the material to a second section of the material; a stabilizing device located between the material and the first portion of the first-down measurement device; and a device for attaching the material to a second portion of the first-down measurement device.

As shown in FIGS. 1 though 13, an apparatus may include an information display 22 and a material 21 having a first section 21a and a second section 21b. A device 23 may be fixed to the material 21 for attaching the first 21a section of the material to the second 21b section. The information display 22 may be attached to the material 21 and the material 21 may be formed such that it is engaged to a first portion 31 of a first-down measurement device. A stabilizing device 24 may be located between the material 21 and the first portion 31 of the first-down measurement device. Further, a device 25 may be provided for attaching the material 21 to a second portion 32 of the first-down measurement device.

An Exemplary Method of Advertising in an American-Style Football Game

In another embodiment, a method of advertising in an American-style football game can include fixing an advertisement to a material and engaging the material with a portion of a first down-down measurement device. As shown in the example of FIG. 1, an advertisement may be placed on a material and the material may be engaged with a portion of a first-down measurement device.

In one implementation, the step of coupling the material may include surrounding the portion of the first-down measurement device with the material. As shown in the example of FIG. 7, a rigid material such as PVC® pipe may be slid along the chain before the chain is attached to a sideline marker of the first-down measurement device. In another implementation, the method may include attaching a first section of the material to a second section of the material. As shown in the example of FIG. 6, a first section of the material may be attached to a second section of the material with a device such as a latch so as to surround the chain.

In one implementation, the method may include locating a stabilization device between the material and the portion of the first-down measurement device. As shown in the example of FIG. 13, a stabilization device may be placed between the material and the chain of the first-down measurement device. In another implementation, the method may include attaching the material to another portion of the first-down measurement device. As shown in the example of FIG. 1, the material may be engaged with a chain and may also be contemporaneously attached to a sideline marker.

Figure 14:
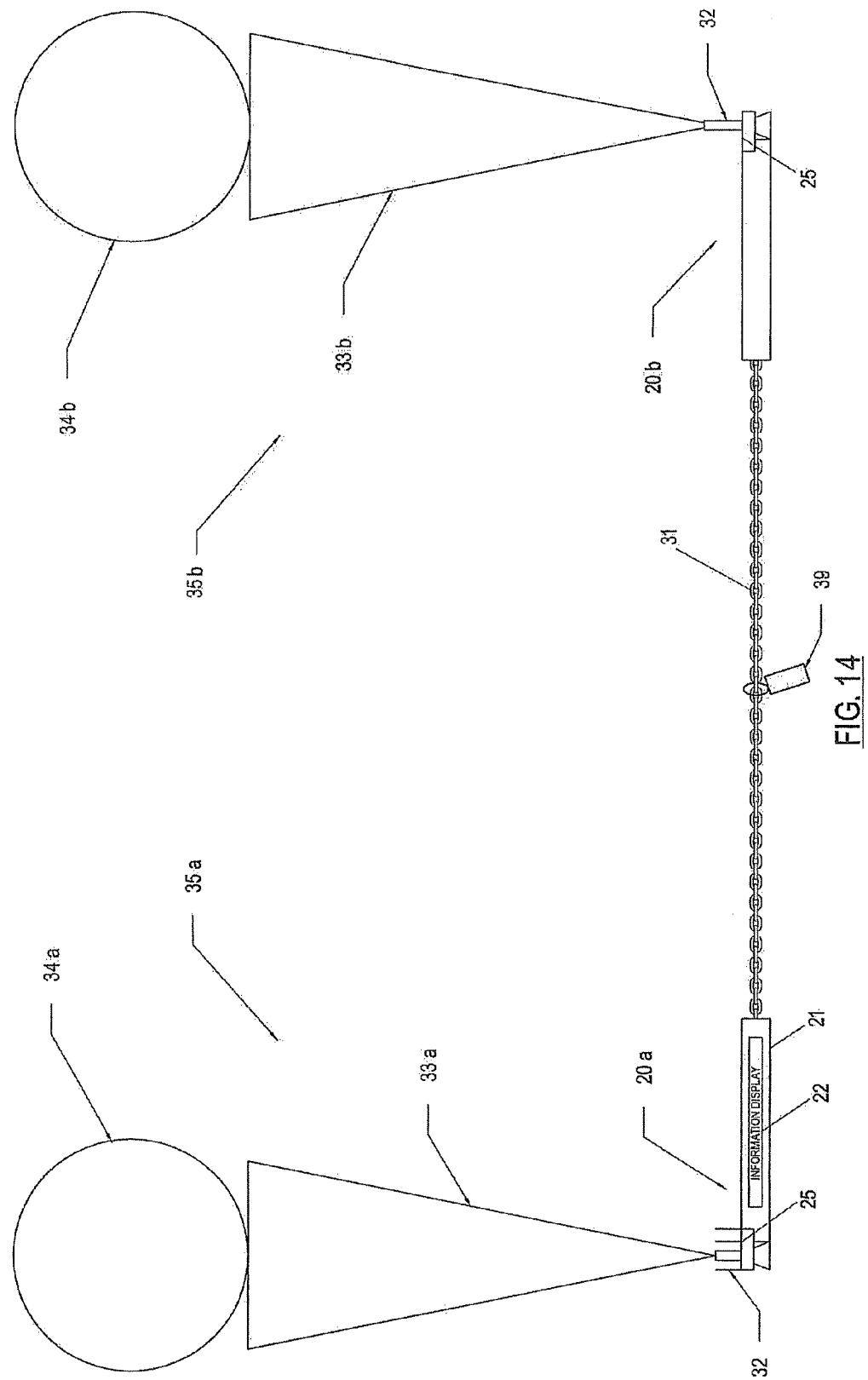
FIG. 14 is an environmental view diagram showing an exemplary system for communicating information in an American-style football game in accordance with the present invention.

An Exemplary System for Communicating Information in an American-Style Football Game In another embodiment, a system for communicating information in an American-style football game can include: a sideline marker for marking a first position on a football playing field; a measuring device connected to the sideline marker; an information display; and a sleeve for engaging the information display with the sideline marker or the measuring device. As shown in FIG. 14, a system can include a first sideline marker 35a for marking the position of the next first down location on a playing field, a second sideline marker 35b for marking the position of the last first down location on a playing field, and a measuring device 31 connected on one end to sideline marker 35a and on the other end to the second sideline marker 35b. The measuring device 31 should be a regulation distance (i.e., ten yards in length). An information display 22 may be engaged, via sleeve 20a and/or 20b, to the measuring device 31 (i.e., chain). The system may also have a moveable 5-yard marker 39 for marking the location of the closest 5-yard field mark.

In one implementation, the system may further include a stabilization device located between the sleeve and the first sideline marker or the measuring device. Referring now to FIG. 13, the system may include a stabilization device 24 located between the sleeve 20 and the chain of the first-clown measurement device (not shown). In another implementation, the system may include a device for engaging the sleeve with the first sideline marker or the measuring device. As shown in the example of FIG. 14, the system may include device 25 attached to the sleeve 20 and a sideline marker 35a.

Another Apparatus for Displaying Information in an American-Style Football Game In another embodiment, an apparatus for displaying information in an American-style football game can include a sleeve engaged to a first-down measurement device, the sleeve including an information display, wherein the sleeve may be wrapped around about one yard of a chain of the first-down measurement device. Referring to FIG. 1, a sleeve 21 may be engaged to a first-down measurement device. The sleeve may include an information display 22 and may be wrapped around about one yard of a chain 31 of the first-down measurement device. In one implementation, the sleeve 21 may be attached to a sideline marker 35 of the first-down measurement device.

An Exemplary Method of Advertising in a Simulated American-Style Football Game In one embodiment, a method of advertising in a simulated American-style football game can include: marking the relative position of a football on a playing field with a first-down measurement device; and displaying an advertisement on a portion of the first-down measurement device. In one implementation the advertisement may be displayed near a sideline marker of the first-down measurement device. For example, in a video game, the position of a football may be marked with a first-down measurement device including a chain and one or more sideline markers. An advertisement may be displayed near the sideline marker on an area surrounding the chain.

CONCLUSION/SUMMARY

Thus, the present invention provides methods, apparatuses, and systems which provide an efficient and economical approach of displaying and/or providing information and/or messages on a first-down measurement device used during American-style football games. It can be appreciated that an apparatus according to one embodiment of the present invention offers a football league or a manufacturer the opportunity to display information, a message, an advertisement, a company symbol (e.g., the Nike® swoosh), or the like on a first-down measurement device during an American-style football game. When the first-down measurement device is brought in from the sideline for a first-down measurement, the advertisement may prominently be displayed to stadium fans through direct viewing or on television and possibly on an in-house football stadium scoreboard. The message may also be displayed in any sanctioned video game(s) which would show first-down measurements.

While the foregoing discussion concerns a singular sleeve, it can be appreciated that a second sleeve (and second stabilization and/or attachment devices) may also be provided on the same chain for placement on the opposite sideline marker of the first-down measurement device as shown in FIG. 14. This second sleeve may be used when possession of the football changes to the team going the opposite direction on the playing field, or at the end of a quarter when the teams reverse direction on the playing field. It is to be appreciated that one or two sleeves of varying or different lengths and/or heights may alternatively be employed.

It is to be understood that variations and/or modifications of the present invention may be made without departing from the scope of thereof. It is also to be understood that the present invention is not to be limited by the specific embodiments, descriptions, or illustrations or combinations of either components or steps disclosed herein.

What is claimed is:

1. An apparatus for use in an American-style football game, comprising a sleeve engaged with a portion of a sideline marker of a first-down measurement device, said sleeve comprising an area having a narrow chromatic bandwidth with one of the group consisting of text, a logo, and combinations thereof superimposed thereon.

2. The apparatus of claim 1, wherein said sleeve is further engaged with a portion of the chain of said first-down measurement.

3. The apparatus of claim 1, wherein said sleeve comprises:
 a) a material having a first and a second section; and
 b) a device fixed to said material for attaching said first section of said material to said second section of said material.

4. The apparatus of claim 3, wherein said material comprises a flexible material.

5. The apparatus of claim 3, wherein said material comprises a rigid material having a hollow interior section.

6. The apparatus of claim 1, wherein said sleeve comprises a rigid material having (i) a hollow interior section and (ii) a first and a second opening for exposing the interior section.

7. The apparatus of claim 1, further comprising a stabilizing device located between said sleeve and a portion of a chain of said first-down measurement device, wherein said stabilizing device comprises one of the group consisting of foam, a gel-filled container, an air-filled container, a brace, a rib, an interim spring, and combinations thereof.

8. The apparatus of claim 1, wherein said sleeve is engaged to said sideline marker by one of the group consisting of a strap, a clip, a wire, a chain, a fabric, and combinations thereof.

9. The apparatus of claim 1, wherein said sleeve has a length of less than about 72 inches.

10. The apparatus of claim 1, wherein said one of the group consisting of text, a logo, and combinations thereof are superimposed on said area near said sideline marker.

11. A method of advertising in a broadcast American-style football game comprising the steps of engaging a sleeve comprising an area having a narrow chromatic bandwidth to a portion of a first-down measurement device and superimposing one of the group consisting of a text, a logo, and combinations thereof on said area of said sleeve.

12. The method of claim 11, further comprising changing said one of the group consisting of text, a logo, and combinations thereof superimposed on said area.

13. The method of claim 11, further comprising the step of surrounding a portion of a chain of said first-down measurement device with said sleeve.

14. The method of claim 13, further comprising the step of attaching a first section of said sleeve to a second section of said sleeve.

15. The method of claim 11, further comprising the step of locating a stabilization device between said sleeve and a portion of a chain of said first-down measurement device, wherein said stabilization device comprises one of the group consisting of foam, a gel-filled container, an air-filled container, a brace, a rib, an interim spring, and combinations thereof.

16. The method of claim 11, further comprising engaging said sleeve with a portion of a sideline marker of said first-down measurement device comprising the steps of:
 a) attaching a first end of an engagement device to said material sleeve;
 b) surrounding said portion of said sideline marker with said engagement device; and
 c) attaching a second end of said engagement device to said sleeve.

17. The method of claim 16, wherein said engagement device is selected from the group consisting of a strap, a clip, a wire, a chain, a fabric, and combinations thereof.

18. A system for advertising in an American-style football game, comprising:
 a) a sideline marker for marking a position on a playing field;
 b) a measuring device connected to the sideline marker;
 c) a sleeve comprising an area having a narrow chromatic bandwidth with one of the group consisting of a text, a logo, and combinations thereof superimposed thereon; and
 d) a device for engaging said sleeve with one of the group consisting of a portion of said sideline marker, a portion of said measuring device, and combinations thereof.

19. The system of claim 18, further comprising a stabilization device located between said sleeve and said measuring device, wherein said stabilizing device comprises at least one of the group consisting of foam, a gel-filled container, an air-filled container, a brace, a rib, an interim spring, and combinations thereof.

20. The system of claim 18, wherein said device is selected from the group consisting of a strap, a clip, a wire, a chain, a fabric, and combinations thereof.

21. A method of advertising in a broadcast American-style football game comprising:
 a) engaging a sleeve comprising an area having a narrow chromatic bandwidth to one of the group consisting of a sideline marker of a first-down measurement device, a chain of said first-down measurement device, and combinations thereof, wherein said sleeve has a length of less than about 72 inches;
 b) placing said sideline marker near a football to determine whether said football has been advanced the requisite distance to achieve a first down;
 c) capturing an image of said football, a portion of said sideline marker, and said narrow chromatic bandwidth area of said sleeve with a video camera; and
 d) superimposing one of the group consisting of a text, a logo, and combinations thereof on said area of said sleeve.

22. The method of claim 21, further comprising changing said one of the group consisting of text, a logo, and combinations thereof superimposed on said area.

23. An apparatus for use in a broadcast American-style football game comprising:
 a) a sleeve comprising an area having a narrow chromatic bandwidth, said sleeve having a length of less than about 72 inches and engaged with (i) a portion of a sideline marker of a first-down measurement device by one of the group consisting of a strap, a wire, a chain, a fabric, and combinations thereof and (ii) a portion of a chain of said first-down measurement device;
 b) a stabilizing device located between said sleeve and a portion of said chain, wherein said stabilizing device comprises one of the group consisting of foam, a gel-filled container, an air-filled container, a brace, a rib, an interim spring, and combinations thereof;
 c) an advertisement comprising a text, a logo, and combinations thereof superimposed on a portion of said area of said sleeve.

24. The apparatus of claim 23, wherein said advertisement is superimposed on said area near said sideline marker.

25. The apparatus of claim 1, wherein said area has an about rectangular shape.

26. The apparatus of claim 25, wherein said area is detachably engaged with said sleeve.

27. The apparatus of claim 26, wherein said area is engaged with said sleeve by a plurality of interweaving hooks and loops.

28. The apparatus of claim 1, wherein said sleeve comprises a first color, and wherein said narrow chromatic bandwidth of said area comprises a second color selected from the group consisting of green and blue.

29. The apparatus of claim 18, wherein said sleeve further comprises a brightly colored portion and said narrow chromatic bandwidth of said area is one of the group consisting of the color green and the color blue, and wherein said area has an about rectangular shape and is detachably engaged with said sleeve by a plurality of interweaving hooks and loops.

30. The method of claim 11, said sleeve further comprising a first color, wherein said narrow chromatic bandwidth comprises a second color different than said first color.

31. The method of claim 30, wherein said first color is orange and wherein said second color comprises one of the group consisting of blue and green.

32. The method of claim 30, wherein said area of said sleeve is defined by an about rectangular shape.

33. The method of claim 32, further comprising superimposing said text, said logo, and said combinations thereof only on said area.

* * * * *